(12) United States Patent
Villeneuve et al.

(10) Patent No.: US 9,827,727 B2
(45) Date of Patent: *Nov. 28, 2017

(54) MOLD FOR A TIRE WITH AN ANNULAR INSERT MADE UP OF A PLURALITY OF PORTIONS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (FR)

(72) Inventors: Bernard Villeneuve, Clermont-Ferrand (FR); Christian Gomet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/910,200

(22) PCT Filed: Jun. 26, 2014

(86) PCT No.: PCT/IB2014/001223
§ 371 (c)(1),
(2) Date: Feb. 4, 2016

(87) PCT Pub. No.: WO2015/019137
PCT Pub. Date: Feb. 12, 2015

(65) Prior Publication Data
US 2016/0167328 A1 Jun. 16, 2016

(30) Foreign Application Priority Data
Aug. 5, 2013 (FR) ...................... 13 01878

(51) Int. Cl.
*B29D 30/06* (2006.01)
*B29D 30/72* (2006.01)
(Continued)

(52) U.S. Cl.
CPC ......... *B29D 30/72* (2013.01); *B29D 30/0601* (2013.01); *B29D 30/0606* (2013.01);
(Continued)

(58) Field of Classification Search
CPC ............ B29D 30/0606; B29D 30/0662; B29D 30/72; B29D 2030/0616; B29C 33/30; B29C 33/306; B29C 33/424
See application file for complete search history.

(56) References Cited

U.S. PATENT DOCUMENTS 1,567,402 A * 12/1925 Venn ...................... B29C 33/424
152/523
1,632,310 A 6/1927 Paynter
(Continued)

FOREIGN PATENT DOCUMENTS

DE 102007005455 A1 8/2008
DE 102010017251 A1 12/2011
(Continued)

*Primary Examiner* — James Mackey
(74) *Attorney, Agent, or Firm* — Dickinson Wright PLLC

(57) ABSTRACT

A mold for vulcanizing and molding a tire is provided herein. The tire includes a tread delimited by two sidewalls, the mold including a ring for molding the tread of the tire and two shells for molding the sidewalls. The mold includes an annular groove extending in a recessed manner in one of the shells and an insert housed in the groove, this insert having tire marking elements and being formed from a plurality of insert parts that are positioned one after another in the annular groove.

5 Claims, 3 Drawing Sheets

(51) Int. Cl.
*B60C 13/00* (2006.01)
*B29C 33/30* (2006.01)
*B29C 33/42* (2006.01)
*B29K 105/00* (2006.01)

(52) U.S. Cl.
CPC .......... *B60C 13/001* (2013.01); *B29C 33/306* (2013.01); *B29C 33/424* (2013.01); *B29D 2030/0612* (2013.01); *B29D 2030/0616* (2013.01); *B29D 2030/726* (2013.01); *B29K 2105/253* (2013.01)

(56) References Cited

U.S. PATENT DOCUMENTS

| | | | | |
|---|---|---|---|---|
| 1,969,083 A | * | 8/1934 | Lawson | B29D 23/24 425/28.1 |
| 2,296,016 A | * | 9/1942 | Bostwick | B29C 33/424 264/293 |
| 2,679,663 A | * | 6/1954 | Schwemler | B29D 30/0633 425/28.1 |
| 4,547,139 A | | 10/1985 | Hershberger | |
| 5,288,449 A | | 2/1994 | Mauro | |
| 5,643,519 A | | 7/1997 | Mauro et al. | |
| 5,939,002 A | * | 8/1999 | Heindel | B29D 30/0606 249/56 |
| 6,315,539 B1 | * | 11/2001 | Yutronkie | B29D 30/0606 249/103 |
| 6,942,476 B2 | * | 9/2005 | Parmelee | B29C 33/32 249/103 |
| 7,384,252 B2 | * | 6/2008 | Iwamoto | B22F 5/007 419/2 |
| 7,883,326 B1 | * | 2/2011 | Parmelee | B29D 30/0606 249/103 |
| 8,512,020 B2 | * | 8/2013 | Lauwers | B29D 30/0629 264/219 |
| 9,150,057 B2 | * | 10/2015 | Voss | B60C 11/042 |
| 2004/0032053 A1 | | 2/2004 | Parmelee et al. | |
| 2011/0180200 A1 | | 7/2011 | Parmelee | |
| 2011/0318532 A1 | * | 12/2011 | Dusseaux | B29D 30/0629 428/141 |

FOREIGN PATENT DOCUMENTS

| | | |
|---|---|---|
| JP | 2006019314 A | 1/2006 |
| WO | 2009007790 A1 | 1/2009 |

\* cited by examiner

MOLD FOR A TIRE WITH AN ANNULAR INSERT MADE UP OF A PLURALITY OF PORTIONS

This application is a 371 national phase entry of PCT/IB2014/001223, filed 26 Jun. 2014, which claims the benefit of French Patent Application No. 13/01878, filed 5 Aug. 2013, the contents of which are incorporated herein by reference for all purposes.

BACKGROUND

The present invention relates to molds for tires. More specifically, it relates to the molding of marking elements on the sidewalls of these tires.

DESCRIPTION OF RELATED ART

It is known that the sidewalls of tires have a large number of markings, such as the manufacturer's mark, the type of tire, the size of the tire, etc. These markings are obtained by providing techniques that are able to mold these markings, referred to below as "marking techniques", on the mold, and more particularly on side parts of this mold that are referred to as "shells".

However, depending on the type of information intended to appear on the sidewall of the tire, it may be necessary to regularly modify the markings on this tire.

Document U.S. Pat. No. 4,547,139 discloses the use of removable plates placed in a shell of a mold. These plates have marking techniques including indications which have to be changed regularly, for example at the tire manufacturing period. However, because the plate has a relatively small size, the amount of information it can contain is limited. Moreover, fixing the plate in the mold is complex.

Document JP61019314 discloses the use of a removable insert in the form of an annular one-piece part. More particularly, this annular insert is housed in a groove extending in a shell of the mold. This insert then has a relatively large diameter, thus requiring great precision in its production in order that it satisfactorily fits in the groove, specifically around the entire circumference of this groove.

Document U.S. Pat. No. 1,632,310 discloses a mold for vulcanizing and molding a tire including a plurality of interchangeable sections that make it possible to mold the sidewall or some other part of the tire. Each section contains molding cavities that form different letters or signs which, when the sections are arranged in a particular manner, make it possible to mold a succession of patterns that have a meaning and make it possible to identify the tires on which they are molded.

There is thus a need to provide a solution for replacing marking means on the inside of a mold which makes it possible to modify a large amount of marking information, while being easier and more practical to realize than in the related art.

SUMMARY

A first subject of embodiments of the invention consists in providing a specifically designed for molding tires in which the marking of the sidewalls is likely to change or evolve.

Another subject of embodiments of the invention consists in providing a tire in which the sidewall marking or patterns have to be produced with a very high level of precision.

To this end, the invention provides a for vulcanizing and molding a tire including a tread delimited by two sidewalls. The mold includes a ring intended for molding the tread of the tire and two shells, separate from the ring, for molding the sidewalls. The mold also includes an annular groove extending in a recessed manner in one of the shells and an insert housed in the groove. The insert has tire marking techniques and this insert is formed from a plurality of insert parts that are positioned one after another in the annular groove.

The embodiments of the invention thus proposes manufacturing an annular insert in a plurality of parts in order to make it easier to produce. Moreover, since each insert part has limited dimensions, it is easier to fit them into the groove in the shell. In addition, if modifications are made to the markings on the sidewall of the tire, only the insert parts includes marking techniques affected by these modifications are replaced. It is thus not necessary to replace an entire insert.

In one particular embodiment, with each insert part having a molding surface able to be in contact with the tire, at least two insert parts have different molding surface features.

It is thus possible to adapt the molding surface features of the insert parts depending on the markings intended to be imprinted on the sidewall. For example, if the marking protrudes from the sidewall, it is possible to improve the contrast between the marking and this sidewall by making the surface of the sidewall rougher. In the same way, if the marking is recessed into the tire, it is possible to improve the contrast by making the surface of the sidewall smoother.

In another embodiment, at least one insert part is produced by laser sintering. This insert part has all or part of the marking techniques of the insert.

The laser sintering method is a method which consists in constructing a part layer by layer by successively superposing layers of powder and selectively fusing this powder. This method may be computer-aided, making it possible to construct fairly complex parts. By using this sintering method for producing insert parts, it is possible to form complex marking techniques on these insert parts, making it possible to improve the visibility of the marking on a tire sidewall.

In another embodiment, at least two insert parts have different dimensions.

Thus, it is possible to produce insert parts which adapt best to the dimensions of the markings to be imprinted on the sidewall of the tire. The production of different markings at different locations on the tire is then made much easier.

In another embodiment, each insert part has contact surfaces that serve to interface with adjacent insert parts. At least two insert parts are connected together in a region of their contact surface, this connection being able to be broken in order to separate the two insert parts.

By connecting all or some of the different insert parts together, it is possible to position all of the annular insert in the mold in one go.

During an operation of changing one of the insert parts, it is then sufficient to break the connections holding it to the other insert parts in order to extract it from the mold and replace it with another suitable insert part.

In another embodiment, with the mold having an equatorial plane, an insert part is offset with respect to another, adjacent insert part in the direction of the equatorial plane of the mold.

In this way, some marking techniques can be offset in the direction of the equatorial plane. These marking techniques that are closer to the equatorial plane of the mold will then make it possible to mold markings that are more recessed into the sidewall of the tire. As a result, these markings will better withstand the kinds of attack that this sidewall can be subjected to, such as curbing of the wheels. The durability of the markings on the tire is then improved.

In another embodiment, the shell includes a through-opening, such as a bore, for example, extending between the insert and the outside of the shell. This type of arrangement makes it possible to introduce a technique for removing the shell when the latter is force-fitted in the groove. In a variant, a plurality of openings or bores are distributed around the circumference of the insert, for example one per insert part.

DESCRIPTION OF THE FIGURES

Further features and advantages of the embodiments of the invention will become apparent from the following description, given by way of non-limiting example, with reference to the attached drawings, in which.

In the following description, elements which are substantially identical or similar will be denoted by identical references.

DETAILED DESCRIPTION

A "tire" refers to all types of resilient tread whether or not it is subjected to an internal pressure.

The "tread" of a tire refers to a quantity of rubber compound delimited by lateral surfaces and by two main surfaces, one of which is intended to come into contact with a road surface when the tire is running.

The "sidewall" of a tire refers to a lateral surface of the tire, said surface being disposed between the tread of the tire and a bead of this tire.

The "bead" of a tire refers to a part of the tire that is intended to be seated on a wheel rim.

A mold refers to a collection of separate molding elements which, when brought closer together, delimit a toroidal molding space for vulcanizing and molding a tire.

The "equatorial plane" refers to a plane perpendicular to an axis of revolution of the mold, separating this mold into two identical half-molds.

The "meridian plane" refers to a plane containing the axis of revolution of the mold.

Figure 1:
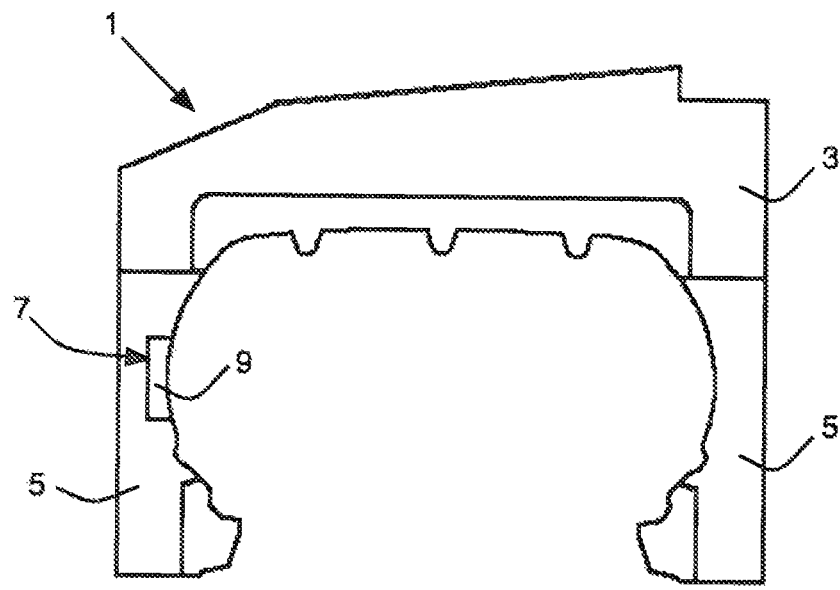
FIG. 1 schematically shows a view in cross section in a meridian plane of a part of a mold according to an embodiment of the invention.

As can be seen in FIG. 1, the mold 1 includes a ring 3 intended for molding the tread of a tire and two shells 5 for molding the sidewalls. The mold 1 also includes an annular groove 7 that extends around the circumference of the sidewall and is recessed into one of the shells 5. An insert 9 is mounted in a removable manner in the groove.

Figure 2:
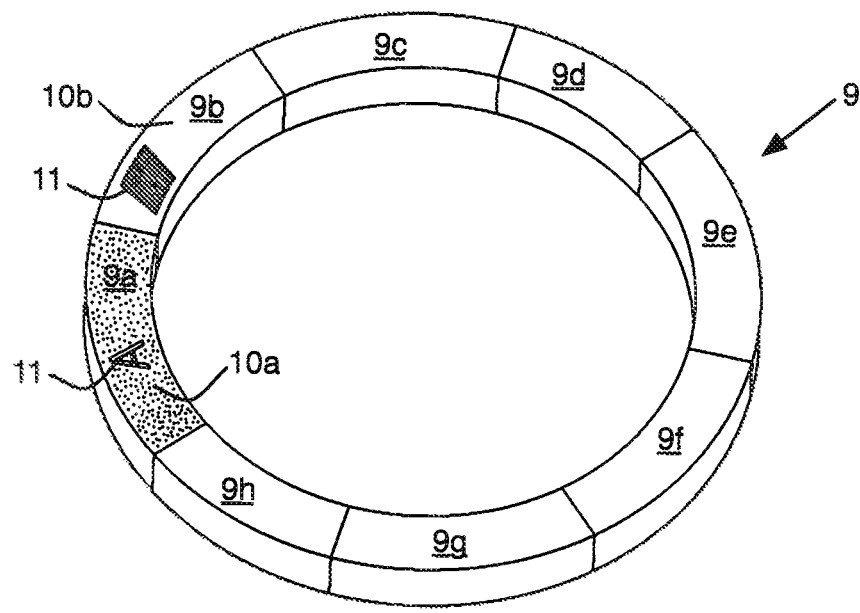
FIG. 2 schematically shows a perspective view of an annular insert suitable for the mold in FIG. 1 and produced according to a first embodiment of the invention.

As shown in the exemplary embodiment in FIG. 2, the insert 9 is formed from a plurality of insert parts 9a to 9h that are aligned angularly one after another so as to form an annulus with suitable dimensions for insertion in the annular groove 7. The insert 9 has tire marking elements 11. These marking elements are provided for identification of the dimensional features of the tire, and/or to identify the manufacturer, and/or to decorate the sidewall with patterns or logos, etc. Each of the plurality of insert parts 9a to 9h has a molding surface 10a, 10b, etc., that is able to be in contact with the tire. The design of the insert in a plurality of parts makes it possible, if necessary, to provide at least two insert parts with different molding surface features.

Figure 3:
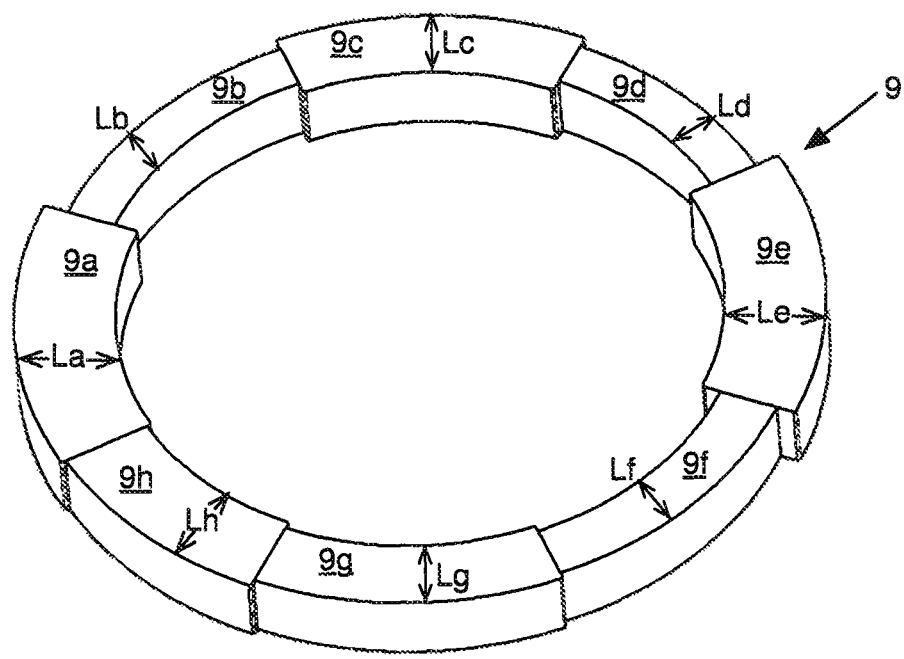
FIG. 3 schematically shows a perspective view of an annular insert suitable for the mold in FIG. 1 and produced according to a second embodiment of the invention.

FIG. 3 presents a variant embodiment in which at least two insert parts have different dimensions. For example, as illustrated, the width L of the insert varies per part, with, in this example, changes in width as follows: La>Lh>Lg>Lf. The width Lc is also greater than that of the two adjacent sections, of width Lb and Ld. The same goes for the section 9e in comparison with the adjacent sections 9d and 9f.

Figure 4:
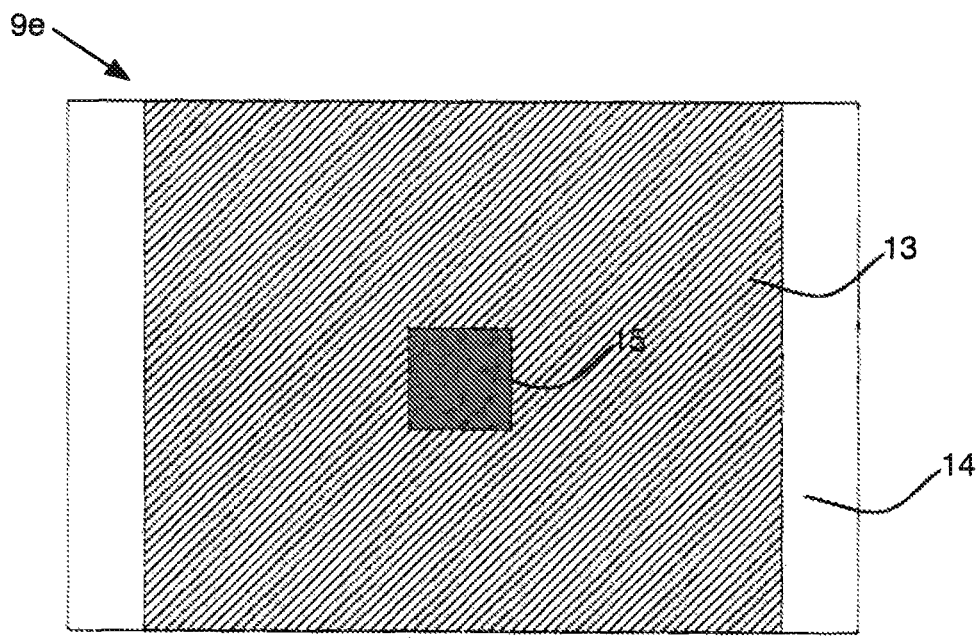
FIG. 4 schematically shows a face of an insert part from FIG. 3 connected to another insert part.

FIG. 4 shows an elevation view of a side face of the insert part 9e, as seen from the part 9f. Since the width Le is greater than the width Lf, the interface between the two sections 9e and 9f produces a joining region with a contact surface 13 and a free surface 14, preferably on each side of the contact surface 13.

A bridge 15, or joining element, makes it possible to fix two adjacent parts of the insert 9 together. In this example, the bridge 15 is provided in the central region of the contact surface 13. In variants, a plurality of bridges can be provided. The profile and the surface of the bridges can vary depending on the embodiment. The bridges are advantageously provided during the manufacture of the insert, in particular when the insert is produced by laser sintering. In order to change an insert part, the bridge(s) connecting the parts in question is/are broken or cut. The section of the bridges is advantageously provided and dimensioned to make this operation easier. Specifically, even though the parts are separable by breaking the bridges when the insert is removed from the mold, mounting the insert in the mold, preferably with a tight fit, confers sufficient rigidity for the molding operations to be able to be carried out without risking breaking the bridges. Moreover, the insertion of the insert into the shell groove confers solid support for effectively withstanding the molding forces.

Figure 5:
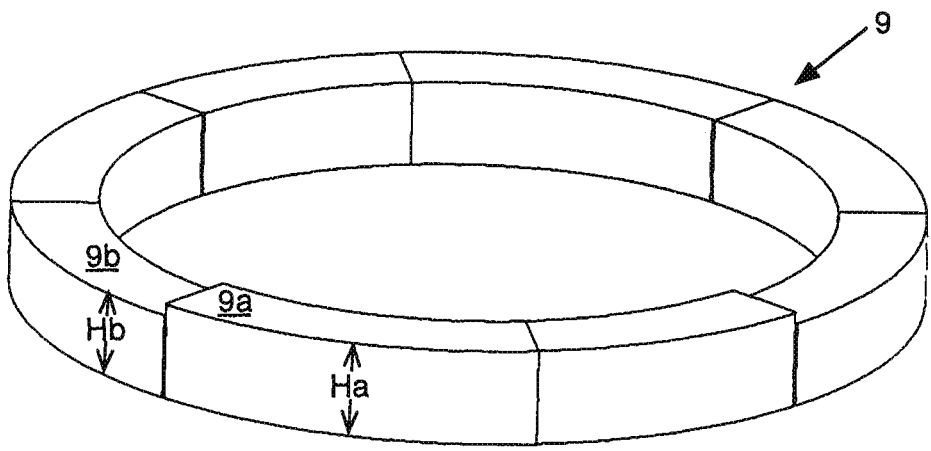
FIG. 5 schematically shows a perspective view of an annular insert suitable for the mold in FIG. 1 and produced according to a third embodiment of the invention.

FIG. 5 shows yet another variant embodiment, in which the heights Ha and Hb of at least two insert parts are different. Thus, the two insert parts are offset with respect to one another in the direction of the equatorial plane of the mold.

Figure 6:
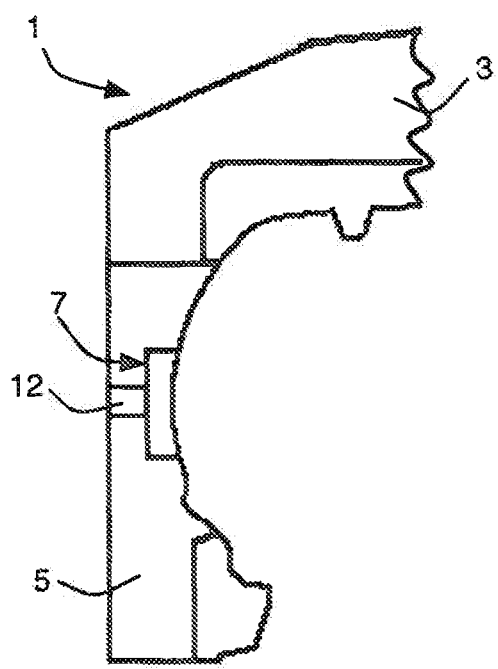
FIG. 6 schematically shows a view in cross section in a meridian plane of a part of a mold according to an embodiment of the invention, showing an opening that allows access to the insert from outside the mold.

In the variant embodiment presented in FIG. 6, a through-orifice 12, such as a bore, provides communication between the outside of the mold and the inside of the mold. This orifice makes it possible to introduce a demolding tool from the outside of the mold in order to make it easier to extract the insert, either as a whole or for one or more insert parts. A plurality of orifices 12 can be distributed angularly around the circumference of the shell.

The figures and their descriptions given above illustrate the invention rather than limit it. In particular, the invention and its various embodiments have just been described in relation to a particular example comprising eight insert parts.

Nonetheless, it is clear to a person skilled in the art that embodiments of the invention may be extended to other embodiments in which, in variants, a different number of insert parts, for example between 2 and 32 parts, and more preferably between six and twelve parts, is provided.

The reference signs in the claims are entirely non-limiting. The verbs "comprise" and "have" do not exclude the presence of elements other than those listed in the claims. The word "a/an" preceding an element does not preclude the presence of a plurality of such elements.

The invention claimed is:

1. A mold for vulcanizing and molding a tire,
the tire comprising a tread delimited by two sidewalls, the mold, including:
  a ring for molding the tread of the tire, and
  two shells, separate from the ring, for molding the sidewalls,
the mold including
  an annular groove that extends in a recessed manner in one of the shells, and
  an insert housed in the annular groove, the insert including tire marking elements, the insert being defined by a plurality of insert parts positioned one after another in the annular groove,
wherein each of the plurality of insert parts has a plurality of dimensions including:
a circumferential length, a radial length, and a height, and at least the radial length of at least one of the insert parts vary from another one of the insert parts,
each of the plurality of insert parts has contact surfaces contactable with and adjacent to one of the plurality of insert parts, and
at least two of the plurality of insert parts are connected together in a region of a respective contact surface, the connection being breakable in order to separate the at least two of the plurality of insert parts.

2. A mold according to claim 1, wherein
each of the plurality of insert parts has a molding surface contactable with the tire,
wherein in at least two of the plurality of insert parts include different molding surface features.

3. A mold according to claim 1, wherein at least one insert part is produced by laser sintering, the one of the plurality of insert parts having all or part of the tire marking elements of the insert.

4. A mold according to claim 1, wherein the mold has an equatorial plane,
one of the plurality of insert parts is offset with respect to another, and
an adjacent insert part of the one of plurality insert parts is in a direction of the equatorial plane of the mold.

5. A mold according to claim 1, wherein at least one of the shells comprises a through-opening extending between the insert and an outside of the at least one of the shells.

* * * * *